March 23, 1971 F. M. NASH 3,572,381
PUMP PRESSURE SYSTEM
Filed May 26, 1969 4 Sheets-Sheet 2
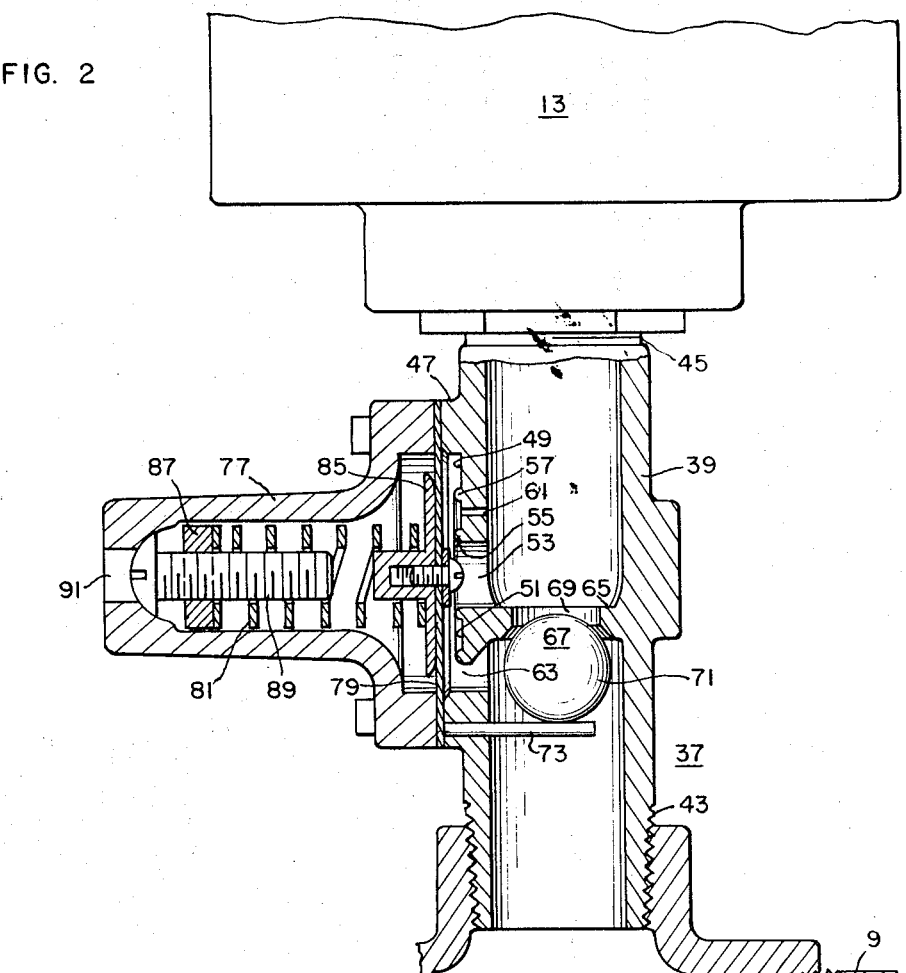
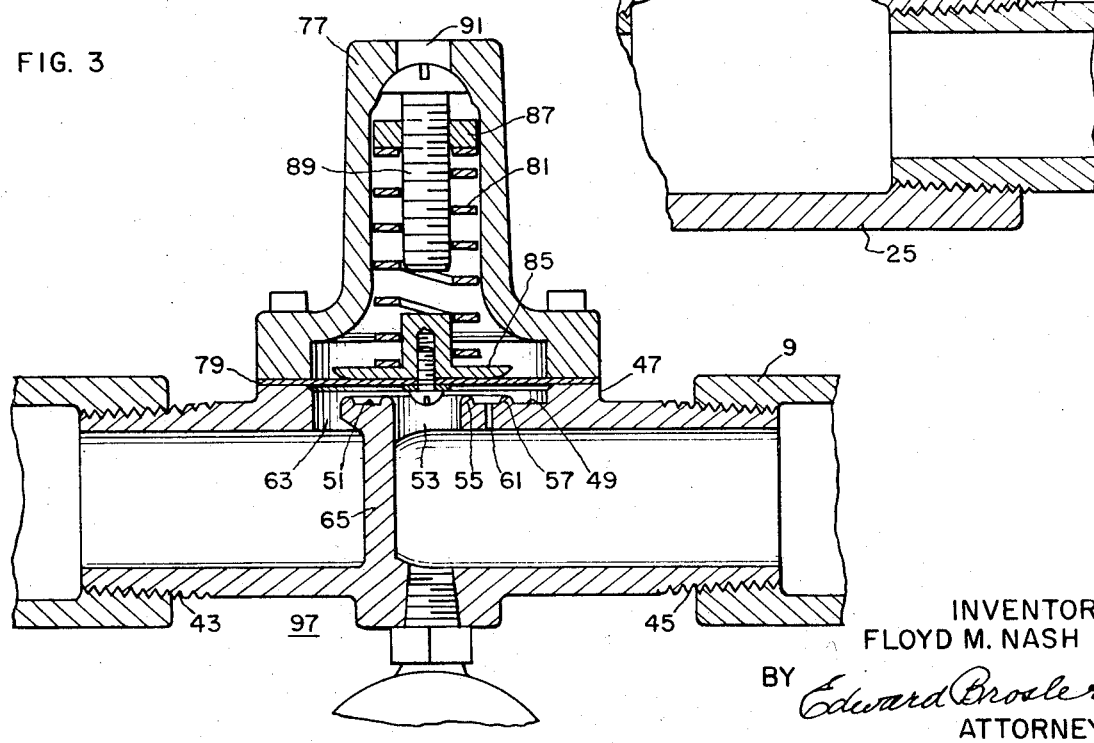
INVENTOR
FLOYD M. NASH
BY Edward Brosler
ATTORNEY

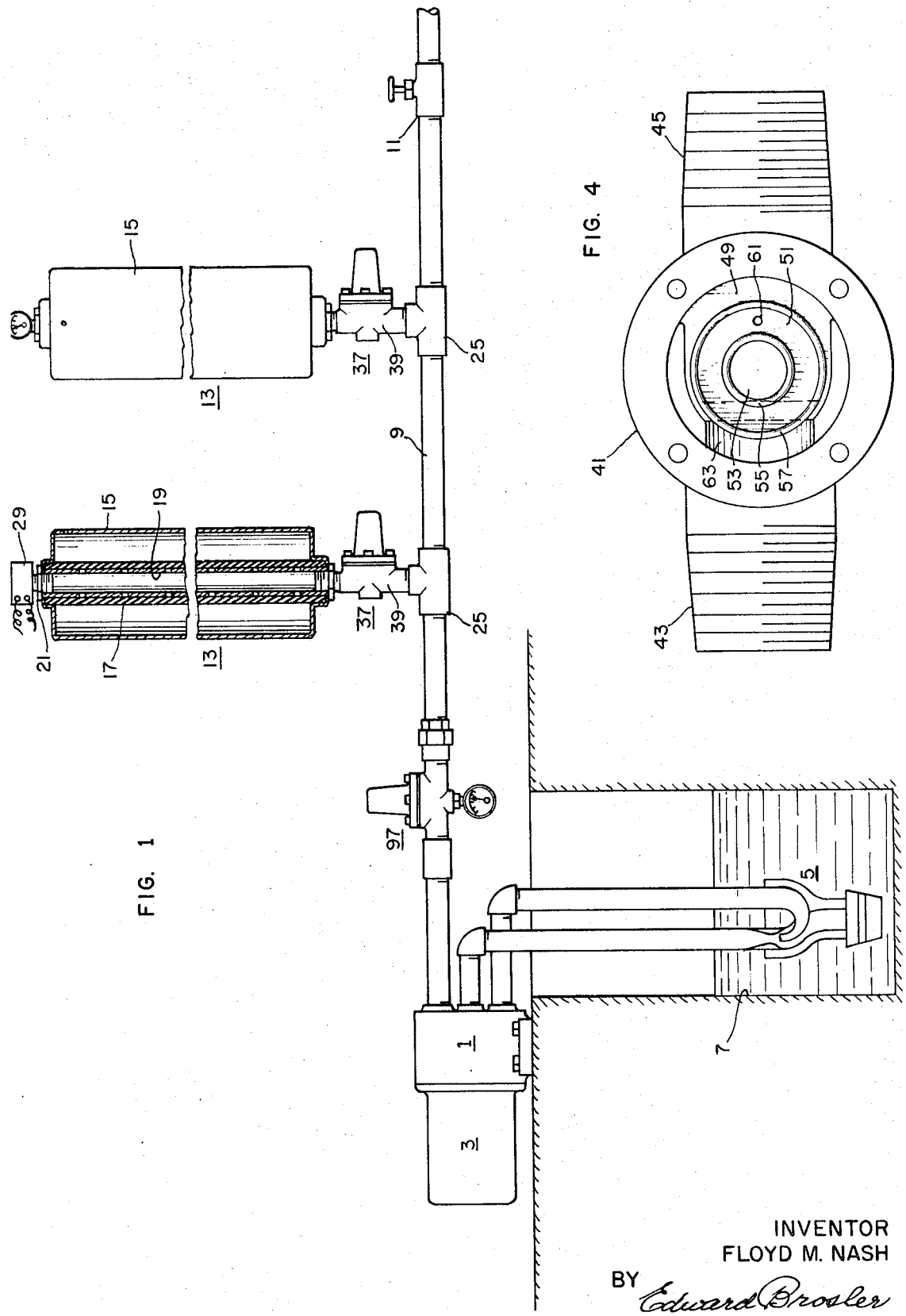

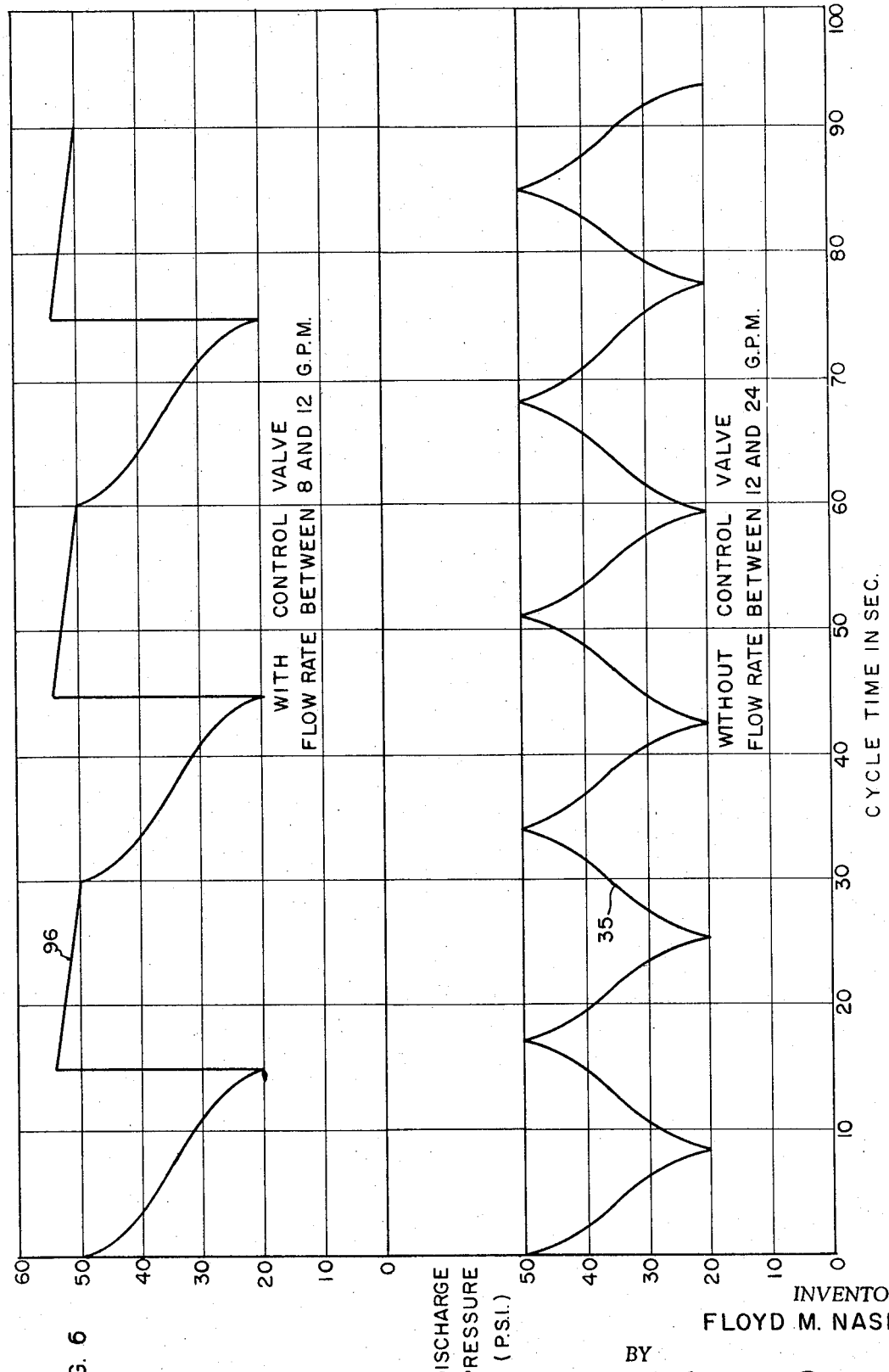

United States Patent Office 3,572,381
Patented Mar. 23, 1971

3,572,381
PUMP PRESSURE SYSTEM
Floyd M. Nash, Little Rock, Ark., assignor to
Jacuzzi Bros. Incorporated
Filed May 26, 1969, Ser. No. 827,855
Int. Cl. E03b 11/16; F04b 49/08
U.S. Cl. 137—568                              5 Claims

ABSTRACT OF THE DISCLOSURE

A pump pressure system controlled by a pressure switch to establish a pressure range of operation, has its pressure tank or equivalent, valve controlled to open for filling, at approximately the maximum pressure of said pressure range, whereby to minimize cycling operations of the pump, while at the same time, improving pressure delivery to service.

---

My invention relates to pump pressure systems, and more particularly to one of the type wherein a pressure switch determines the pressure range of operation of the system.

Pump pressure systems of the type under consideration, employ a pressure tank, or one or more units such as form the subject matter of a patent to Candido Jacuzzi for Airless Water Pressure Systems, No. 3,394,733 of July 30, 1968. The pressure tank or the unit of the aforementioned patent, can be referred to generically as an accumulator.

In a conventional pump pressure system installation, the size of the accumulator is tied in to the capacity of the pump. At the average operating pressure of the system, which may for example, be of the order of 30 lbs. per square inch. Obviously, a small accumulator will fill and empty at a more rapid rate than a larger one, and accordingly, the size or number of such accumulators is generally determined by the maximum allowable cycle frequency that would be acceptable to the customer, or as would be determined by the limits set by the electrical motor manufacturer.

Among the objects of my invention are:

(1) To provide a novel and improved pump pressure system;

(2) To provide a novel and improved pump pressure system in which the pump, for a given accumulator capacity, will cycle at a lower frequency than in a comparable conventional system;

(3) To provide a novel and improved pump pressure system which will have a more acceptable pressure delivery characteristic than a comparable conventional system;

(4) To provide a novel and improved pump pressure system which will cycle at a lower frequency than a comparable conventional system, and at the same time provide a more acceptable pressure delivery characteristic;

(5) To provide a novel and improved valve assembly for a pump pressure system, which, when installed in such system, will reduce pump cycling frequency;

(6) To provide a novel and improved valve assembly for a pump pressure system, which, when installed in such system, will enable reduction in accumulator capacity without increasing pump cycling frequency; and (7) To provide a novel and improved valve assembly for a pump pressure system, which, when installed in such system, will impart to such system, a more acceptable pressure delivery characteristic.

Additional objects of my invention will be brought out in the following description of a preferred embodiment of the same, taken in conjunction with the accompanying drawings, wherein, FIG. 1 is a view depicting a pump pressure system installation embodying the present invention;

FIG. 2 is a view, in section, through a valve assembly of the present invention as employed in conjunction with an accumulator in the system of FIG. 1, and constituting an important component of such system;

FIG. 3 is a view, in section, through a modified form of the valve assembly of FIG. 2, and adapted for use in another portion of the system of FIG. 1, in establishing minimum pump pressure in such system;

FIG. 4 is an internal plan view of the valve assembly of FIG. 2;

FIG. 6 is a view depicting the pressure characteristics of a pump in the system of FIG. 1, as compared to a pump in a comparable conventional system.

Figure 5:
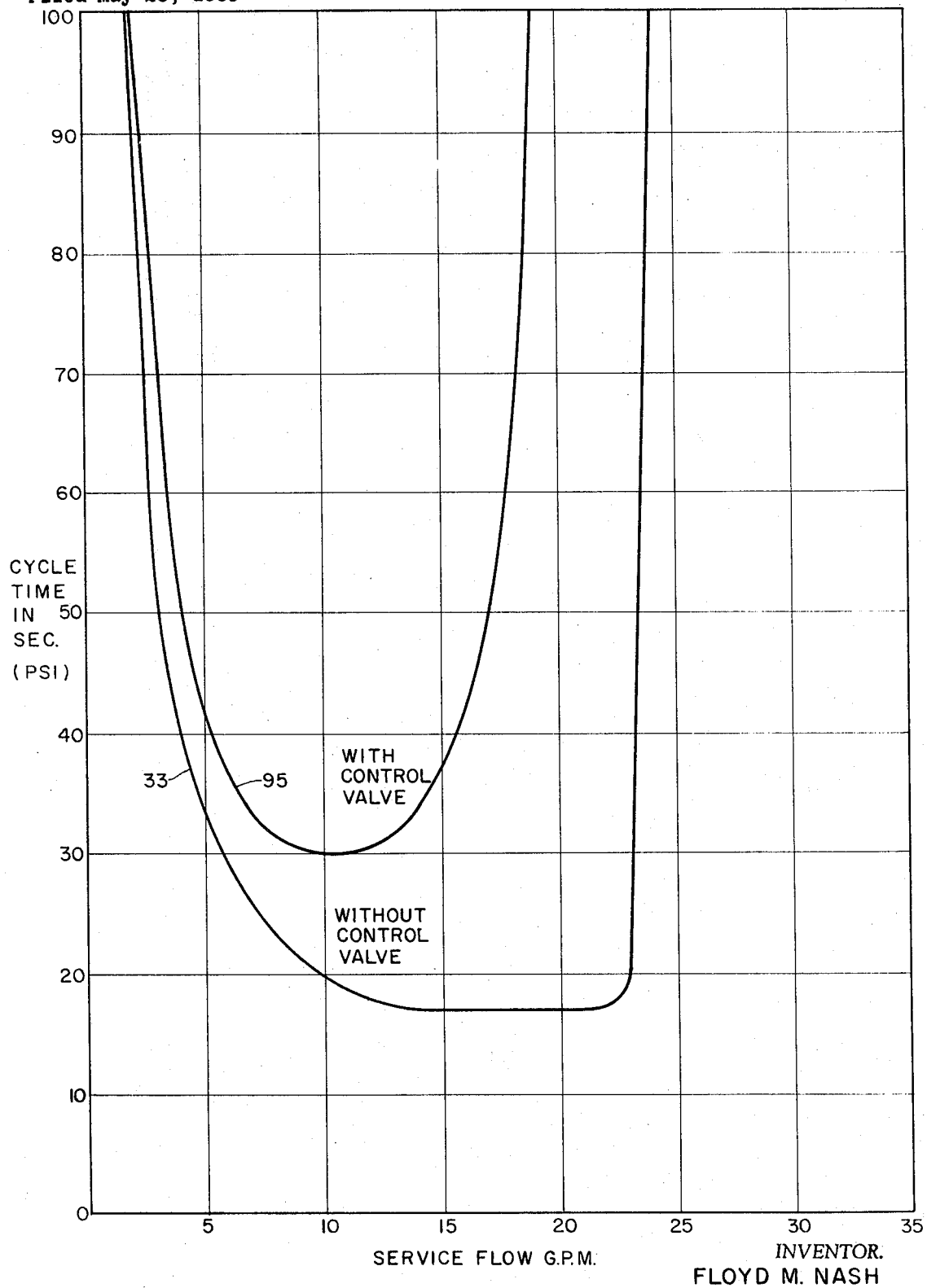
FIG. 5 is a view depicting curves comparing pump cycling frequency in a pump pressure system such as disclosed in FIG. 1, with a comparable conventional pump pressure system.

Referring to the drawings for details of my invention in its preferred form, I have illustrated in FIG. 1, a pump pressure system for supplying liquid under pressure within a predetermined pressure range, such system comprising a pump 1 driven by a motor 3, and flow coupled in a conventional manner to an injector pump 5 disposed below water level in a well 7, the pump having a discharge line 9 to service, controlled by a valve 11.

Coupled to the discharge or service line, are one or more accumulators units 13, those illustrated being of the type covered by the aforementioned Pat. No. 3,394,733.

Each such accumulator unit broadly involves a vented housing 15 having an axially disposed inflatable tube 17 supported lengthwise by a perforated pipe 19 running axially of the housing and terminating at each end, in a threaded fitting 21.

In a conventional system, one end is normally directly flow coupled to the service line 9 through a T-connection 25 while at the upper end, a pressure switch 29 is installed, where it will be directly exposed to pressure conditions within the accumulator. Such pressure switch will be electrically connected, in known manner, in the circuit of the pump motor 3 so that, when the pressure in the accumulator has dropped to the lower value of the pressure range for which the pressure switch is designed, it will connect the pump motor in circuit, and start the pump to bring the pressure in the accumulator back up to that pressure representing the upper end of the pressure range for which the pressure switch is adjusted, whereupon, the pressure switch will then function to disconnect the pump motor from circuit.

Under these conditions, upon opening the service line, water will be supplied to service from the accumulator, and at the prevailing pressure therein, until such pressure drops to the lower value of the pressure range, whereupon the pump motor will again be connected in circuit and the pump will start functioning for another pumping cycle.

It will be apparent that in such conventional system, the pump cycling frequency will vary with discharge to service, and for purposes of comparison, one may determine the cycling frequency of the pump at various values of pump capacity, representing various values of continuous discharge to service. By plotting values thus obtained, for a particular pump pressure system, one obtains a cycling characteristic for a conventional system, of which the curve 33 of FIG. 5 would be representative. In such a pump pressure system, designed to function within a pressure range of 20 to 50 lbs. per square inch, for example a minimum cycle time of approximately 17 seconds prevailed within a pump capacity range of roughly 12 to 24 gallons per minute. This means that under these conditions, the pump will be cycling a maximum of approximately 3½ times per minute and over a relatively wide range of discharge from the system to service. This represents the worst condition of operation of such system.

Under such condition of maximum cycling, the pressure variation per cycle will follow a curve 35, such as depicted in FIG. 6, wherein the pump will gradually increase in discharge pressure as the accumulator fills up to its maximum pressure, at which moment, the pressure switch will shut off the pump and the accumulator will begin discharging to service. Consequently, maximum pressure to service will be only momentary, and the pressure rise and pressure drop will be rather sharp, occurring, as previously indicated, at the rate of approximately 3½ times per minute of operation of the system under the conditions noted.

In accordance with the present invention, the cycling frequency and pressure characteristics are improved considerably through the installation of a novel and improved valve assembly 37 in the service line flow connection to each accumulator.

Referring to FIGS. 2 and 4 for details of my novel and improved valve assembly as applied to an accumulator, to improve the cycling frequency and pressure characteristics of the system, the same involves a valve body 39 having an enlarged mid-section 41 with a threaded nipple 43 at one end and a similar nipple 45 at the other end.

Such enlarged mid-section is bounded at one side by a relatively wide circular rib 47 terminating in a planar surface. Slightly below such rib plane, are concentric channels 49 and 51 about a central opening 53 to the interior of the valve body, the inner of such concentric channels being defined by concentric circular ribs 55 and 57, with the outer of these ribs in conjunction with the relatively wide rib 47, defining the outer channel 49.

Flow coupling the inner channel to the interior of the valve body, is a leak passage 61.

Flow from the interior of the valve body to the outer channel 49 is established by a connecting passageway 63, this passageway being physically separated from the central opening 53, interiorly of the valve body, by a partition 65.

For use of this valve assembly in conjunction with an accumulator, for the purpose previously indicated, said partition may contain a check valve assembly 67 formed by a hole 69 through the partition to provide a valve seat, and a ball check valve 71 within the valve body and adapted to seat thereon.

A pin 73 extending traversely of the valve body and anchored at one end in the wall thereof just behind the ball check valve will serve to limit movement of the ball between its opening and closing position, the pin serving an additional function of causing the ball, upon being unseated, to strike the pin and roll or slide sideways to provide free flow of liquid through the partition hole.

Spanning the outermost circular rib 47 and clamped in position thereon by a cap or bonnet 77 bolted to the rib, is a diaphragm 79, which would, in the absence of other factors, occupy a position slightly spaced from the ribs 55, 57, defining the inner channel. The diaphragm, however, is backed up by an adjustable compression spring 81, the adjustment of which is such as to normally pressure the diaphragm into engagement with the ribs defining the inner channel, in which position of adjustment, the communicating passageway 63 from the interior of the valve body to the outer channel, is cut off from the inner channel and the central opening into the valve body.

As to the specific details of the means for adjusting the spring to normally pressure the diaphrgam to its blocking off position, a diaphragm backup disc 85 is assembled to the diaphragm by a screw and provides for pressure engagement of the spring 81.

In the upper end of the bonnet, the spring bears against a nut 87 through which an adjusting screw 89 is threaded, with the head of the screw pressure engaging the inner end wall of the bonnet, which wall is provided with an opening 91 for access to the adjusting screw with a screw driver for adjustment purposes.

The valve assembly 37 is installed in the system between the service line 9 and each accumulator 13 with the ball check valve 71 facing the service line. When so installed, the pump, during operation, will supply both service and/or each accumulator as the prevailing situation demands.

Water entering a valve assembly will both close the check valve and attempt to gain access to the accumulator by lifting the diaphragm from its normal seating position. Such lifting of the diaphrgam can occur only when the water pressure reaches a value sufficient to overcome the pressure of the diaphrgam spring 81. In a pressure system where the pressure is set to control operation of the system within a pressure range of say 20–50 pounds per square inch, the valve spring will be adjusted to the upper limit pressure and preferably 3 or 4 lbs. above that.

Assume the pump to be in a pumping cycle, which would be instigated by the pressure switch, when the pressure within the accumulator is at the lower end of the pressure range of the system, the pump will supply all service demands, and at a pressure demanded by the system in its entirety. Due to the pressure setting of the valve assembly associated with the accumulator, no water can enter the accumulator until the pressure in the system reaches a value sufficient to lift the diaphragm and effect a flow to the associated accumulator.

When this happens, water will enter the accumulator, building up pressure therein until the pressure switch senses the upper limit pressure for which it is set, and then functions to shut down the pump. Thereupon, the accumulator will take over and, in response to the pressure therein, the check valve will open and pressure throughout the system will be established and maintained at the accumulator pressure, awaiting the demands of service. In response to service demands, the accumulator pressure will gradually diminish until the accumulator pressure reaches the lower end of the pressure range of the system and the pressure switch will then cut in the pump for another pumping cycle.

By plotting the cycle time in seconds against pump capacity, it will be noted, by reference to the curve 95 of FIG. 5, that the worst conditions of operation, as judged by maximum cycling of the pump, will occur when the service flow is within the range of 8 to 12 gallons per minute, and under these conditions, the pump cycle time will be approximately 30 seconds in duration. This would mean about two pumping cycles per minute.

Comparing this with the situation where the valve assembly of the present invention is not employed, it will be appreciated that without the valve assembly, the pump will not only cycle about 1¾ times as often as in the improved system, under the worst conditions of operation, but such worst condition for cycling will continue through a range of service demands about six times as wide as would be experienced in a system employing the valve assembly of the present invention.

Also, by plotting the pressure characteristic in the service line, as it is altered by the presence of the valve assembly in the system, such pressure characteristic will appear as curve 95 in FIG. 5, in comparative relationship to the pressure characteristic curve 35 representing pressure variations in the service line without the valve assembly in the system, both pressure characteristic curves representing the worst condition of operation of the system, with and without the valve assembly.

It is significant to note in comparing these two pressure characteristic curves, that the pressure in the service line, with the valve assembly in the system, will be maintained higher and over longer periods than when the valve assembly is not utilized, thus rendering better service to the user.

By eliminating the check valve from the valve assembly as depicted in FIG. 3, the resulting valve assembly 97 may be utilized in elevating the basic pressure level of a system, by installing such valve assembly in the service line between the pump and the first accumulator. When so installed, the pump will have to develop a pressure depending on the adjustment of the diaphram spring, before water can be delivered to the service line and the accumulators. Thus in a system designed for operation within a pressure range of say 20–50 pounds per square inch, this valve assembly will be adjusted to the lower pressure value of 20 pounds per square inch, or preferably slightly above that to allow for pressure drop in the service line.

From the foregoing description of my invention in its preferred form, it will be apparent that the same is subject to alteration and modification without departing from the underlying principles involved and I accordingly do not desire to be limited in my protection to the specific details illustrated and described, except as may be necessitated by the appended claims.

I claim:

1. A pressure system for supplying liquid under pressure within a pressure range, comprising a pump, an accumulator for holding liquid under pressure within such pressure range, for discharge to service, a flow path from said pump to said accumulator for supplying liquid to said accumulator, pressure responsive means in pressure sensing relationship to said accumulator for stopping said pump when said pressure responsive means senses pressure in said accumulator at the upper end of said pressure range, and starting said pump when said pressure responsive means senses pressure in said accumulator at the lower end of said pressure range, and means in the flow path from said pump to said accumulator for blocking flow into said accumulator until pressure in said flow path reaches a value around the upper end of pressure in said pressure range.

2. A pressure system in accordance with claim 1, characterized by said means for blocking flow into said accumulator, including a valve assembly calibrated to open at such value of pressure, and means during pumping of liquid into said accumulator, for blocking discharge of liquid from said accumulator to service until said pressure responsive means senses pressure in said accumulator, of a value around the upper end of said pressure range and stops said pump.

3. A pressure system in accordance with claim 1, characterized by said means for blocking flow into said accumulator comprising a valve assembly including a first passageway, leading from said flow path, into said accumulator, a biased valve in said first passageway and calibrated to open at said aforementioned pressure value around the upper value of pressure in said pressure range, a second passageway, leading from said accumulator to said flow path, and a valve in said second passageway blocking flow of liquid into said accumulator during flow thereinto through said first passageway, but adapted to open to provide discharge from said accumulator upon completion of flow into said accumulator and stopping of said pump.

4. A pressure system in accordance with claim 3, characterized by said valve assembly including a valve body having a partition, said first passageway involving an opening to one side of said partition and an opening to the other side of said partition, both said openings occupying a common plane, said biased valve involving a diaphram spanning said openings, and pressure calibrated means bearing on said diaphram in the direction of closing said first passageway, said second passageway involving an opening in said partition and said valve in said second passageway involving a ball valve adapted to seat in said partition on the side exposed to input flow of liquid from the flow path to the accumulator, whereby said ball valve will seat in response to such input and unseat upon cessation of such flow.

5. A pressure system in accordance with claim 4 characterized by a pin located in said valve body in spaced relationship to said ball valve when in its seated position, to cause lateral shift of said ball valve in its unseated position, while retaining the same in functional relationship to said partition opening.

References Cited

UNITED STATES PATENTS

| 1,808,209 | 6/1931 | Earl | 137—568X |
| 3,346,014 | 10/1967 | Jacuzzi | 137—568X |
| 3,394,733 | 7/1968 | Jacuzzi | 137—568 |

FOREIGN PATENTS

| 1,085,114 | 1/1955 | France | 137—568 |

M. CARY NELSON, Primary Examiner

R. B. ROTHMAN, Assistant Examiner

U.S. Cl. X.R.

137—493.7